United States Patent [19]

Warnock et al.

[11] 3,832,927
[45] Sept. 3, 1974

[54] APPARATUS FOR FINISHING OVER-CUT PATTERN PIECES

[75] Inventors: Emmit F. Warnock, Tarrytown; Bobby Wayne Williamson; Gordon H. Ellington; William O. Mitchell, all of Vidalia, all of Ga.

[73] Assignee: Oxford Industries, Inc., Atlanta, Ga.

[22] Filed: Jan. 11, 1973

[21] Appl. No.: 322,727

[52] U.S. Cl............... 83/409, 83/425.3, 83/471, 83/477.2, 83/478, 83/491, 83/925 CC, 83/DIG. 1
[51] Int. Cl............................................. B26d 7/22
[58] Field of Search ....... 83/422, 425.3, 425.4, 475, 83/474, 477.2, 478, 409, 925 CC, 491, 471, DIG. 1

[56] References Cited
UNITED STATES PATENTS

| 335,635 | 2/1886 | Sears | 83/425.3 |
| 375,909 | 1/1888 | Wilson | 83/425.3 X |
| 691,428 | 1/1902 | Wuhrmann | 83/425.3 X |
| 1,541,603 | 6/1925 | Turner | 83/425.3 X |
| 2,116,194 | 5/1938 | Fink | 83/425.3 X |
| 3,286,744 | 11/1966 | Stall et al. | 83/409 |

*Primary Examiner*—Frank T. Yost
*Attorney, Agent, or Firm*—Jones, Thomas & Askew

[57] ABSTRACT

Method and apparatus for cutting small pattern pieces such as sleeve facings wherein the pattern pieces are over-cut in the cutting room, then the over-cut pattern pieces are held down and guided through pairs of rotary knives that are properly spaced to remove the excess material and provide accurately cut pattern pieces.

3 Claims, 7 Drawing Figures

APPARATUS FOR FINISHING OVER-CUT PATTERN PIECES

BACKGROUND OF THE INVENTION

This invention relates to a fabric cutting method and apparatus, and is more particularly concerned with a method and apparatus for forming an accurate cut on over-cut pattern pieces.

In the garment industry pattern pieces are normally cut by providing a large stack of pieces of fabric, imposing the pattern on the stack, and saw-cutting around the various pieces of the pattern. For the relatively large pieces the saw-cutting is sufficiently accurate; however, the smaller pieces that must be cut more accurately are generally over-cut, then die cut so they will be accurate enough to fit the garment.

The die cutting, or die clicking as it is known in the trade, is quite accurate and gives a good, even edge to the cut pieces, but there are some disadvantages to this technique. For instance, the fabric being die clicked is subject to "die ride" in which the fabric slips with respect to the die as cutting pressure is exerted on the fabric. To solve this problem the dies must have die click allowance built in to vary the spread of the die in order to allow for the slipping of the fabric. The fabric must also be over-cut to a greater extent so that, even with fabric slippage, there will be enough fabric outside the actual die cavity to hold the fabric. This results in additional waste of fabric. In addition, the thickest stack of fabric that normally can be cut by die clicking is about one inch, which means that a great number of separate cuts must be made for a given quantity of pattern pieces.

SUMMARY OF THE INVENTION

The method and apparatus of the present invention overcome the above-mentioned and other difficulties with the prior art method and apparatus by providing a method wherein a stack of over-cut pattern pieces is held and moved relative to properly spaced cutting means which remove the excess material. The apparatus according to the present invention provides a plurality of rotary knives appropriately spaced along a single axis, the distance between the knives being the desired width of the finished piece. Holding means are provided for holding a stack of over-cut pattern pieces as the pieces move relative to the knives, and guard means are provided that are complementary to the holding means whereby the knives are covered at all times to prevent an operator from being injured.

The stack of pattern pieces is held in the proper position for cutting; but, since the cutting is done by rotary knives, the pressure required to hold the pieces in place is insufficient to cause any appreciable distortion of the size or shape of the pieces, even though the pieces may be a knit or a soft-weave fabric. Further, several pairs of knives can be arranged in series so two or more pattern pieces can be laid out contiguously and cut simultaneously. This would reduce the amount of waste because only two edges would be over-cut, there being no waste between the contiguous pieces. In addition, the height of a stack of fabric that can be cut by the apparatus is limited only by the diameter of the rotary knives, which can be several inches.

DESCRIPTION OF A PREFERRED EMBODIMENT

Figure 1:
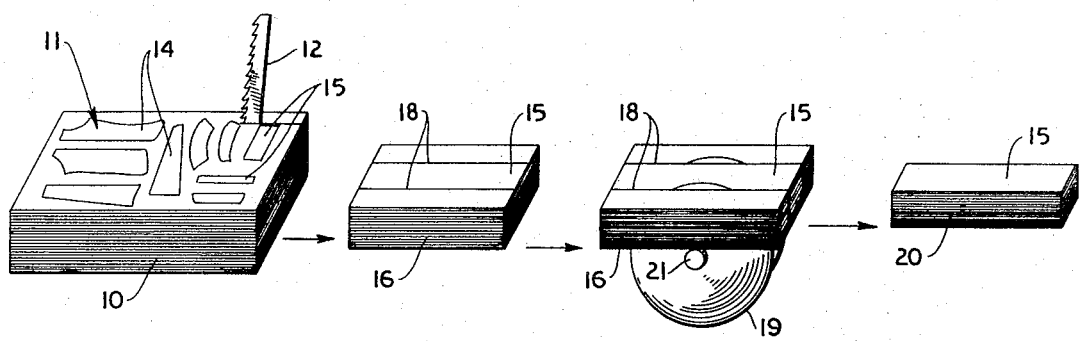
FIG. 1 is a schematic representation illustrating the steps in cutting the pattern pieces in accordance with the present invention.

Referring now more particularly to the drawings and to that embodiment of the invention here chosen by way of way of illustration, atttention is directed to FIG. 1 which shows the general process in the use of the present invention. The stack 10 of fabric has a pattern 11 imposed thereon. A saw 12 cuts the entire stack 10 to cut out each individual pattern piece. The relatively large pattern pieces 14 can be cut sufficiently accurately by the saw 12 so that, when cut, they are ready for assembly of a garment. However, in most garments there are relatively small pattern pieces, such as the pieces 15, that must be cut quite accurately in order to fit properly when the garment is assembled. The relatively small pieces 15 are usually in the trimmings such as cuffs, collars, facings and the like.

As is illustrated in FIG. 1, the relatively small pattern pieces are over-cut with the saw 12 to produce a stack 16 of fabric having the pattern of a piece 15 imposed thereon, but cut beyond the pattern lines 18. This stack 16 is fed to a pair of knives 19 to cut along the pattern lines 18. The knives 19 are spaced apart a distance substantially equal to the distance between the lines 18 so that, when the stack 16 is fed to the knives 19, both of the lines 18 will be cut simultaneously to produce the stack 20 of finished pattern pieces 15. Though the cuts made by the knives 19 may not be exact, the cuts can easily be well within tolerances usual in the garment industry.

From the foregoing it will be understood that the present invention has its primary application in cutting pattern pieces that have two straight lines, and one good example of such a piece is a sleeve facing. The following description will therefore be in connection with the sleeve facing, those skilled in the art being aware that the invention is adaptable to other pattern pieces as well.

Figure 2:
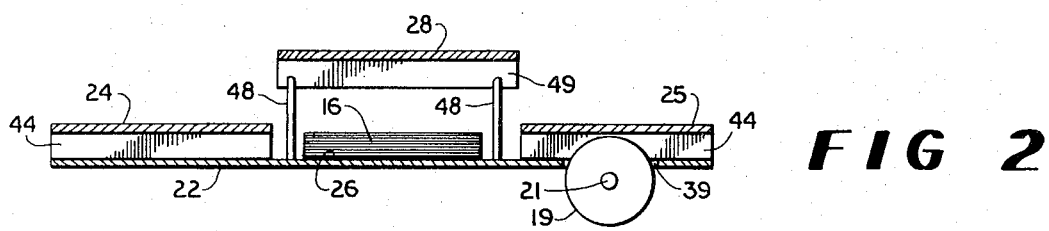
FIGS. 2, 3 and 4 are schematic illustrations of the steps involved in the final cutting of the pattern pieces using apparatus made in accordance with the present invention.
Figure 3:
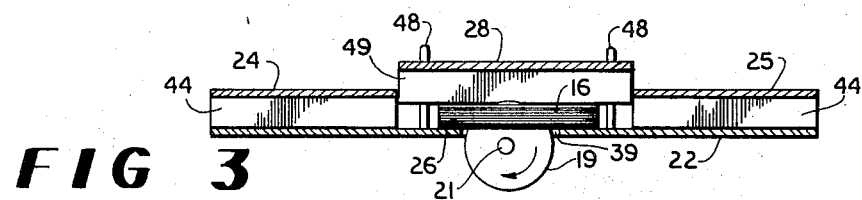
Figure 4:
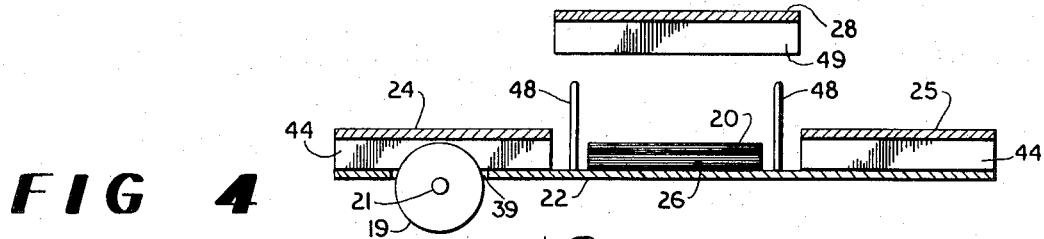

Attention is now directed to FIGS. 2 through 4 of the drawings for a general understanding of the apparatus. The rotary knives 19 rotate about their axis 21. There are runners 22 to which are secured guard means 24 and 25 defining a platen area 26 between the guard means 24 and 25.

Beginning in the position shown in FIG. 2, the guard means 25 covers the knives 19, and a stack 16 is placed on the platen area 26. A holding means 28 is placed on top of the stack 16, and the entire assembly is urged to the right. Pins 48 engage the holding means 28, and the pins are fixed to the runner 22 so that the runners move, carrying with it the guard means 24 and 25. As the assembly moves, the platen area 26 having the stack 16 thereon will also move as indicated in FIG. 3, so the stack 16 traverses the knives 19. Once the stack 16 has completely traversed the knives 19, the guard means 24 covers the knives 19, and the holding means 28 can be removed to give access to the stack 20 of completed sleeve facings 15.

Figure 5:
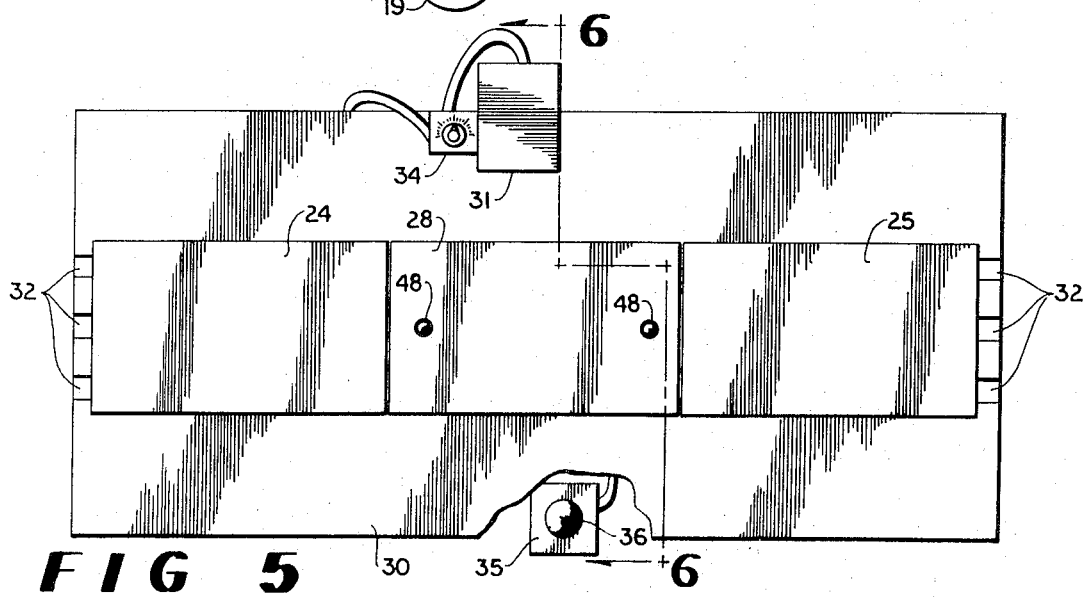
FIG. 5 is a top plan view of one preferred embodiment of the cutting apparatus of the present invention.

Looking now at FIG. 5 of the drawings, the apparatus includes a top plate 30 having a motor 31 mounted substantially centrally of the rear edge thereof. The guard means 24 and 25 and the holding means 28 are arranged longitudinally along the top plate 30, and the top plate 30 is provided with grooves 32 to receive the runners 22.

The speed of the knives 19 is preferably variable because some fabrics cut better at slower knife speeds and other fabrics cut better at higher knife speeds. To vary the speed of the knives 19, there is a motor speed control 34, here shown as a rheostat to vary the speed of the motor 31. Also, it is desirable to have the knives 19 rotate when in use but to stop when they are not in use. Since the knives 19 are necessarily quite sharp they can be hazardous when rotating, so a convenient on-off switch 35 is provided in the form of a foot pedal having a push-button 36 for energizing the motor 31 when desired. Of course the knives should be covered at all times, but the feature of de-energizing the motor 31 when the knives 19 are not in use provides an additional safety feature.

Figure 6:
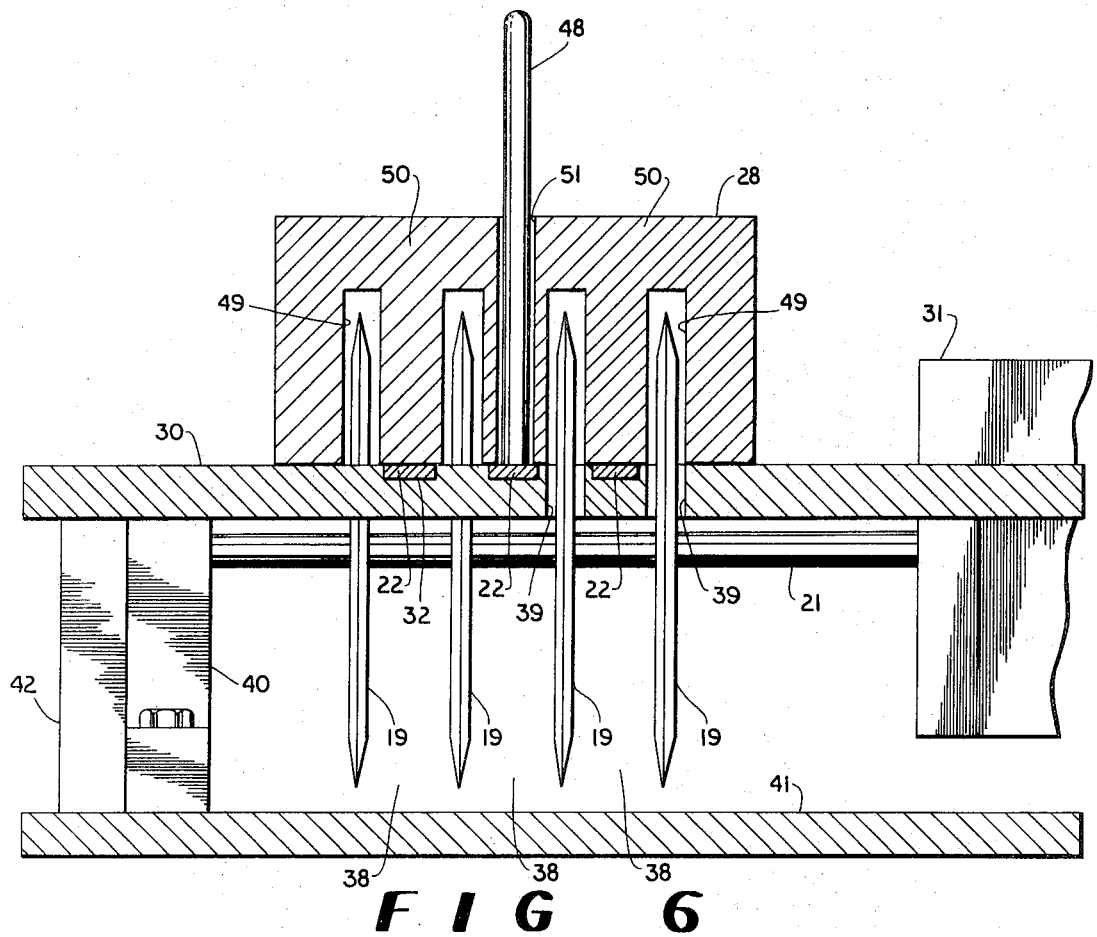
FIG. 6 is a cross-sectional view taken substantially along the line 6—6 of FIG. 5.

As is shown in FIG. 6, the apparatus here chosen by way of illustration includes four knives 19 defining three pattern spaces 38, so three stacks 20 of pattern pieces 15 can be produced simultaneously. The knives 19 are fixed to the shaft 21 for rotation therewith, the shaft 21 being driven by the motor 31. The shaft 21 is immediately below the top plate 30 to have the greatest possible portion of the blades 19 above the plate 30 and available for cutting. The top plate 30 has slots 39 therein, one slot 39 being in alignment with each knife 19 so the knives protrude through the slots 39 to be exposed above the top plate 30.

The end of the shaft 21 that is opposite from the motor 31 is supported by a pillow block 40 which is secured to a bottom plate 41. The top plate 30 is parallel to the bottom plate 41 and is spaced therefrom by a plurality of stanchions 42. The top plate 30 and bottom plate 41 therefore form a housing which encloses the lower portions of the knives 19.

The runners 22 are located between the knives 19, in the spaces 38; therefore, with the four knives 19 shown there are three runners 22. For each of the runners 22 there is a complementary groove 32, the grooves 32 being so dimensioned that the runners 22 will be slidably received therein.

Figure 7:
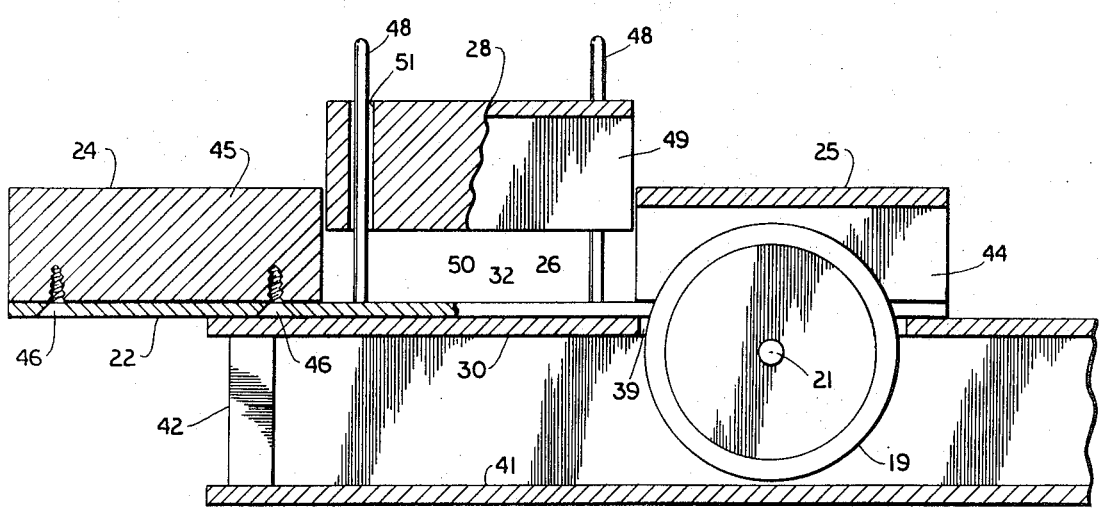
FIG. 7 is a partial longitudinal cross-sectional view of the apparatus shown in FIGS. 5 and 6.

Looking now at FIGS. 6 and 7, the guard means 24 and 25 are substantially identical, being rectangular in form and having longitudinal tunnels 44 therethrough to leave partitions 45 between the tunnels 44. It is to these partitions 45 that the runners 22 are attached, for example by screws 46. The guard means 24 and 25 are therefore fixed to the runners 22 so they will slide with the runners 22; and, the tunnels 44 are spaced so the knives 19 will traverse the tunnels without engaging any portion of the guard means 24 or 25.

The holding means 28 is similar, and complementary to the guard means 24 and 25 in that it is rectangular having tunnels 49 therethrough with partitions 59 therebetween. However, the holding means 28 is not fixed to the runners 22, but is removable therefrom. A pair of pins 48 is fixed to one of the runners 22, here shown as the center runner, and the holding means 28 has a pair of holes 51 through a partition 50 to mate with the pins 48. Thus, the holding means 28 can be placed on the platen area 26 with the pins 48 received within the holes 51, so movement of the holding means 28 along the top plate 30 will move the runners 22 and carry the guard means 24 and 25. When the holding means 28 is received over the pins 48, the tunnels 49 of the holding means will be longitudinally aligned with the tunnels 44 of the guard means, and the partitions 50 of the holding means will be longitudinally aligned with the partitions 59 of the guard means.

When there is no fabric or the like on the platen area 26, the holding means 28 can be placed on the platen area, and the tunnels 49 in the holding means 28 will be aligned with the tunnels 44 in the guard means 24 and 25. Thus, the assembly can be slid back and forth across the top plate 30 and the knives 19 will be enclosed within the tunnels 44 and 49.

In operation it should now be understood that a stack 16 of fabric will be cut from the stack 10 by the saw 12, the pieces being over-cut to be cut to final size. The pattern pieces may be single pieces as shown in FIG. 1, or there may be several pieces laid out contiguously as previously described. In the latter case, there will be less waste, though the pieces can be effectively cut as shown in FIG. 1.

The runners 22 will preferably be in the left-hand position as shown in FIGS. 2 and 7 of the drawings, the holding means 28 will be removed from the platen area 26, and the stack 16 will be placed on the platen area 26 between the pins 48. Next, the holding means is placed on the top of the stack 16 with the pins 48 received through the holes 51. The operator presses on the holding means 28 which causes the partitions 50 to press against the fabric, the push-button 36 is depressed to energize the motor 31 and cause the knives 19 to rotate, and the operator slides the holding means 28 to the right. Since the holding means 38 engages the pins 48 which are in turn fixed to a runner 22, the runners 22 and the guard means 24 and 25 will be moved to the right causing the stack 16 to engage the knives 19 and cut the fabric.

As indicated in FIG. 3, the knives 19 rotate clockwise. Since the slope of a tengent on the left side of the knives 19 will always be positive, the forces exerted on the fabric will tend to stretch the fabric and to urge the fabric against the holding means 28. This technique works well with most fabrics, even if the fabric is relatively soft. For harder fabrics that are more dimensionally stable, the fabric and knives can be moved relative to each other in either direction, but the fabric must be able to withstand the compressive forces exerted on it by having the stack 16 move from right to left as viewed in FIG. 3. Thus, if a sufficiently hard fabric is to be cut, it would be more efficient to move from left to right, remove the cut pieces, place uncut pieces on the platen and move from right to left. This procedure would eliminate the wasted motion of returning the apparatus to the left-hand position between cuts.

Once the stack 16 has fully traversed the knives 19, there will be a stack 20 of finished pieces 15 for each of the spaces 38, and two piles of waste. The knives 19 will be covered by the guard means 24, and the pushbutton 36 is released to deenergize the motor 31 and stop the blades 19. The holding means 28 is removed from the pins 48, and the completed pattern pieces are removed from the platen area 26.

With the apparatus here illustrated, a greater depth of cut can be obtained than with the conventional die clicking. Successful embodiments thus far have been able to cut a depth of from 1½ to 2 inches, and it is possible that greater depths can be achieved without sacrificing the efficiency of the apparatus.

It will now be seen that there is a platen area 26 provided that is movable relative to a plurality of knives. A holding means 28 holds a stack of fabric on the platen area for cutting, and guard means 24 and 25 assure that the knives are covered at all times. Safety of the apparatus is further improved by having the knives 19 driven only during the cutting of the knives.

It will be understood by those skilled in the art that the precise method steps and the particular apparatus here shown are by way of illustration only; therefore, numerous changes and modifications may be made, and the full use of equivalents resorted to without departing from the scope of the invention as defined by the appended claims.

We claim:

1. Apparatus for cutting a stack of pattern pieces or the like comprising a plurality of knives spaced apart a predetermined distance, a platen area traversable across said knives, holding means to hold a stack of pattern pieces on said platen area, said holding means defining a plurality of tunnels therethrough with the tunnels being spaced apart a distance corresponding to the spacing of said knives, means for fixing said holding means with respect to said platen area, and means to guide said platen area as it traverses said knives.

2. Apparatus for cutting a stack of pattern pieces or the like comprising a plurality of knives spaced apart a predetermined distance, a platen area traversable across said knives, holding means to hold the stack of pattern pieces on said platen area, means to guide said platen area as it traverses said knives, guard means defining a plurality of tunnels therethrough spaced apart said predetermined distance, said means to guide said platen area comprising at least one runner fixed to said guard means and slidable between said plurality of knives, means for fixing said holding means with respect to said platen area including a pair of pins fixed to said runner, said holding means defining holes therein, and said holes being located to receive said pair of pins therethrough.

3. Apparatus for cutting a stack of pattern pieces or the like comprising a plurality of knives spaced apart a predetermined distance, a platen area traversable across said knives, holding means to hold the stack of pattern pieces on said platen area, means to guide said platen area as it traverses said knives, a pair of guard means, a runner slidable between said plurality of knives, and each one of said guard means being fixed to one end of said runner on opposite sides of said platen area.

* * * * *